United States Patent
Perronnin et al.

(10) Patent No.: US 9,727,532 B2
(45) Date of Patent: Aug. 8, 2017

(54) CLUSTERING USING NON-NEGATIVE MATRIX FACTORIZATION ON SPARSE GRAPHS

(75) Inventors: Florent Perronnin, Domene (FR); Guillaume Bouchard, Crolles (FR)

(73) Assignee: XEROX CORPORATION, Norwalk, CT (US)

( * ) Notice: Subject to any disclaimer, the term of this patent is extended or adjusted under 35 U.S.C. 154(b) by 2902 days.

(21) Appl. No.: 12/109,496

(22) Filed: Apr. 25, 2008

(65) Prior Publication Data

US 2009/0271433 A1 Oct. 29, 2009

(51) Int. Cl.
G06F 17/30 (2006.01)
G06F 17/16 (2006.01)
G06K 9/62 (2006.01)

(52) U.S. Cl.
CPC .......... *G06F 17/16* (2013.01); *G06K 9/6224* (2013.01)

(58) Field of Classification Search
CPC ............................................... G06F 17/30598
See application file for complete search history.

(56) References Cited

U.S. PATENT DOCUMENTS

| | | | |
|---|---|---|---|
| 6,687,696 B2* | 2/2004 | Hofmann et al. | |
| 7,475,027 B2* | 1/2009 | Brand | 705/7.29 |
| 7,689,559 B2* | 3/2010 | Canright et al. | 707/999.007 |
| 8,195,734 B1* | 6/2012 | Long et al. | 708/520 |
| 2002/0165884 A1* | 11/2002 | Kreulen et al. | 707/532 |
| 2005/0246354 A1* | 11/2005 | Tamayo et al. | 707/100 |
| 2006/0089812 A1* | 4/2006 | Jacquez | 702/23 |
| 2006/0155751 A1* | 7/2006 | Geshwind et al. | 707/102 |
| 2006/0235812 A1* | 10/2006 | Rifkin et al. | 706/14 |
| 2007/0005589 A1* | 1/2007 | Gollapudi | 707/5 |
| 2007/0076869 A1* | 4/2007 | Mihcak et al. | 380/54 |
| 2007/0239694 A1* | 10/2007 | Singh et al. | 707/3 |
| 2009/0001262 A1* | 1/2009 | Visser et al. | 250/282 |
| 2009/0055139 A1* | 2/2009 | Agarwal et al. | 703/2 |
| 2009/0083222 A1* | 3/2009 | Craswell et al. | 707/3 |
| 2009/0083258 A1* | 3/2009 | Koren et al. | 707/5 |

OTHER PUBLICATIONS

Wei Xu, Document clustering based on non-negative matrix factorization, 200307, SIGIR '03 Proceedings of the 26th annual international ACM SIGIR conference on Research and development in informaion retrieval, pp. 267-273.*

Aggarwal et al., "On the Surprising Behavior of Distance Metrics in High Dimensional Space," Int. Conf. on Database Theory (ICDT), pp. 420-434 (2001).

Baker et al., "A Hierarchical Probabilistic Model for Novelty Detection in Text," manuscript (1999).

Blei et al., "Latent Dirichlet Allocation," Journal of Machine Learning Research 3, pp. 993-1022 (2003).

(Continued)

*Primary Examiner* — Mohammad S Rostami
(74) *Attorney, Agent, or Firm* — Fay Sharpe LLP

(57) ABSTRACT

Object clustering techniques are disclosed. A nonnegative sparse similarity matrix is constructed for a set of objects. Nonnegative factorization of the nonnegative sparse similarity matrix is performed. Objects of the set of objects are allocated to clusters based on factor matrices generated by the nonnegative factorization of the nonnegative sparse similarity matrix.

5 Claims, 1 Drawing Sheet

(56) References Cited

OTHER PUBLICATIONS

Cooper et al., "Summarizing Video Using Non-Negative Similarity Matrix Factorization," IEEE Multimedia Signal Processing Workshop, pp. 1-4 (2002).
Ding et al., "A Min-max Cut Algorithm for Graph Partitioning and Data Clustering," Proc. of IEEE Int. Conf. on Data Mining (ICOM), pp. 107-114 (2001).
Ding et al., "On the Equivalence of Nonnegative Matrix Factorization and Spectral Clustering," SIAM Int'l. Conf. Data Mining (SDM'05), pp. 606-610 (2005).
Fouss et al., "An Experimental Investigation of Graph Kernels on a Collaborative Recommendation Task," Proc. of the IEEE Int. Conf. on Data Mining (ICDM) pp. 863-868 (2006).
Gaussier et al., "A hierarchical model for clustering and categorizing documents," Advances in Information Retrieval: $24^{th}$ BCS-IRSEG European Colloquium on IR Research Glasgow, UK, (2002).
Hofmann, "Unsupervised Learning by Probabilistic Latent Semantic Analysis," Journal of Machine Learning, vol. 42, pp. 177-196 (2001).
Lee et al., "Learning the parts of objects by non-negative matrix factorization," Nature, vol. 401, pp. 788-791 (1999).
Lehoucq et al., "ARPACK Software," at http://www.caam.rice.edu/software/ARPACK/indexold.html, last visited on May 13, 2008.
Luxberg et al., "A Tutorial on Spectral Clustering," Technical Report No. TR-149, Max Planck Institute for Biological Cybermetics (2006).
Ng et al., "On Spectral Clustering: Analysis and an algorithm," NIPS, (2002).
Povey et al., "Frame Discrimination Training of HMMS for Large Vocabulary Speech Recognition," Technical Report No. CUED/F-INFENG/TR332, Cambridge University Engineering Department (2000).
Saerens et al., "The Principal Components Analysis of a Graph and its Relationships to Spectral Clustering," ECML (2004).
Sarkar et al., "A Tractable Approach to Finding Closest Truncated-commute-time Neighbors in Large Graphs," $23^{rd}$ Conference on Uncertainty in Artificial Intelligence (UAI), 2007.
Shi et al., "Normalized Cuts and Image Segmentation," IEEE Trans. on Pattern Analysis and Machine Intelligence, vol. 22, No. 8, pp. 888-905 (2000).
Srebro et al., "Maximum-Margin Matrix Factorization," Advances in Neural Information Processing Systems (NIPS) (2005).
Bindel et al., "Symmetry of Bound and Antibound States in the Semiclassical Limit," (2007).
Chen, et al. "Deriving semantics for image clustering from accumulated user feedbacks" Proc. of the $15^{th}$ Intl. Conf. on Multimedia, Sep. 29, 2007, p. 313-316.
Zass, et al. "A unifying approach to hard and probabilistic clustering" Computer Vision, ICCV 2005, vol. Oct. 17, 2005, pp. 1-8.
Wild, et al. "Improving non-negative matrix factorizations through structured initialization" Pattern Recognition, vol. 37, No. 11, pp. 2217-2232.

\* cited by examiner

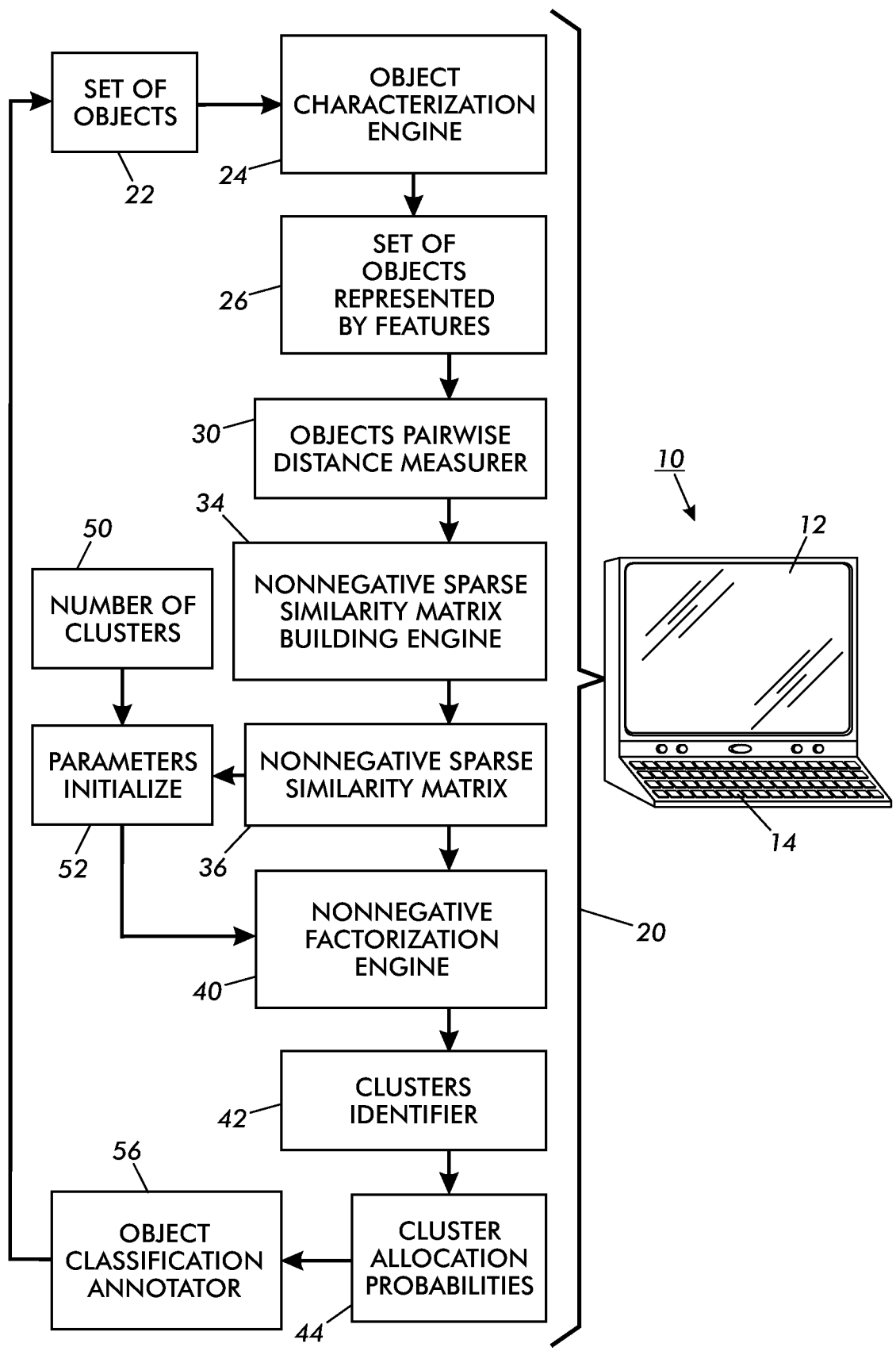

CLUSTERING USING NON-NEGATIVE MATRIX FACTORIZATION ON SPARSE GRAPHS

BACKGROUND

The following relates to the informational, data storage, and related arts.

Clustering is a useful operation in the informational arts. A clustering operation receives a set of objects, such as documents, images, or so forth, and groups the objects according to similarity as measured by features of the objects.

A known clustering approach for objects is spectral clustering. In this approach, a similarity matrix is constructed in which the matrix elements store similarity measures between objects. The similarity matrix is symmetric, in that the value of matrix element (i,j) equals the value of the matrix element (j,i). In some suitable formulations of the spectral clustering approach, a symmetric similarity matrix is decomposed using eigenvalue decomposition to generate a product of matrices $A \cdot D \cdot A^T$ where D is a diagonal matrix whose diagonal elements are eigenvalues of the symmetric similarity matrix, A is another matrix, and the superscript "T" denotes a transpose operation. In the spectral clustering paradigm, the columns of the matrix A are interpreted to associate objects with clusters.

The spectral clustering approach has certain disadvantages. The condition of a symmetric similarity matrix may not be satisfied for certain types of similarity measures. The eigenvalue decomposition processing is also computationally expensive, especially for large-scale clustering involving objects numbering in the thousands, tens of thousands, or more. Further, spectral clustering is strongly dependent upon the number of clusters, which must be selected a priori.

Another approach related to clustering is probabilistic latent semantic analysis (PLSA), which has been applied to text documents. In PLSA, text documents are represented as histograms of word occurrences, sometimes called "bag of words" representations. The histogram representing each document can be thought of as a vector having vector elements corresponding to words and vector element values being the counts of the word occurrences. For example, if the vector element indexed i=5 corresponds to the word "cat", and a given document has fifty-five occurrences of the word "cat", then in the bag-of-words representation of the document the vector element i=5 has the value fifty-five. Documents relating to similar topics are expected to have similar word distributions, i.e. similar bag-of-words representations. Clusters are also represented by bag-of-words representations for which the vector element values can be thought of as being indicative of the expected counts of word occurrences for documents belonging to the cluster. The PLSA approach employs an iterative expectation-maximization (E-M) algorithm to optimize the clusters, wherein the bag-of-words representation of each cluster is computed from the counts of word occurrences belonging (in a probabilistic sense) to that cluster. Non-Negative Matrix Factorization and PLSA were independently discovered: PLSA corresponds to the Maximum Likelihood Estimation of a probabilistic model, whereas the Non-Negative Matrix Factorization algorithm has a geometric interpretation in terms of minimization of the Kullback-Leibler divergence between the word concurrence matrix and a low-rank non-negative matrix. Both interpretations lead to the same algorithm, and we treat them as equivalent in the following.

The Non-Negative Matrix Factorization approach for clustering text-based documents is not readily generalized to objects of arbitrary type, since it relies upon counts of word occurrences at both the vector representation level and at the functional level in that the effectiveness of the clustering is reliant upon the word count histograms being "distinctive" for different clusters. Advantageously, documents relating to distinct different subjects typically use distinctively different subject matter-related vocabularies. As a result, the bag-of-words representations are typically sparse vectors having high word counts for words of the subject matter vocabulary, and having zero or very low word counts for words that are not part of the subject matter vocabulary. Feature sets used to characterize objects of types other than textual documents sometimes do not have such a high level of sparsity.

BRIEF DESCRIPTION

In some illustrative embodiments disclosed as illustrative examples herein, a clustering method comprises: constructing a nonnegative sparse similarity matrix for a set of objects; performing nonnegative factorization of the nonnegative sparse similarity matrix; and allocating objects of the set of objects to clusters based on factor matrices generated by the nonnegative factorization of the nonnegative sparse similarity matrix.

In some illustrative embodiments disclosed as illustrative examples herein, a clustering system comprises a processor configured to construct a nonnegative sparse similarity matrix for a set of objects, perform nonnegative factorization of the nonnegative sparse similarity matrix, and allocate objects of the set of objects to clusters based on factor matrices generated by the nonnegative factorization of the nonnegative sparse similarity matrix. The clustering system further comprises a user interface configured to display a representation of the cluster allocations of objects of the set of objects.

BRIEF DESCRIPTION OF THE DRAWINGS

The FIGURE diagrammatically shows an objects clustering system.

DETAILED DESCRIPTION

As used herein, the term "optimize" and similar terms such as "minimize" or "maximize" are to be broadly construed as referring to processes that improve the parameter or set of parameters to be optimized, minimized, maximized, or so forth, and are not to be narrowly construed as being limited to processes that yield an absolute or global optimum, minimum, maximum, or so forth. Similarly, the term "random" and similar terms are to be broadly construed as encompassing pseudorandom, stochastic, or other relevant approximations.

With reference to the FIGURE, a user interface 10 includes a display 12 and one or more user input devices, such as an illustrated keyboard 14, a mouse, a trackpad, or so forth. The user interface 10 may be embodied as a computer, a laptop computer, a personal data assistant (PDA), an Internet server operatively connected with a user terminal, or so forth. The illustrated user interface 10 further includes a processor (not shown) executing software or firmware that defines an objects clustering system 20 diagrammatically indicated in the FIGURE. Alternatively, a separate processor executing software, firmware, or other instructions may be provided to embody the objects clustering system, such separate processor being in operative communication with a user interface to enable a user to visualize clustering results. The processor, whether integrated with the user interface 10 or provided as a separate component, may be variously embodied as a digital microprocessor, digital microcontroller, Internet server system, or so forth. The software or firmware comprising instructions executable by the processor may be stored on any suitable storage medium, such as a magnetic disk, an optical disk, an Internet server, a read-only memory (ROM), a random access memory (RAM), or so forth.

The objects clustering system 20 receives a set of objects 22 to be clustered. The objects may be substantially any type of object, such as photographs or other images, audio files or content, video files or content, document images, textual documents, mixed-content documents, or so forth. Typically, all the objects of the set of objects 22 are of the same type (e.g., all images, or all audio files or content, or so forth) although clustering of objects of different types is also contemplated.

An object characterization engine 24 receives the set of objects 22 to be clustered, and derives feature characterizing the objects. For example, if the objects are images then the features may include global features such as image aspect ratio, image size, image contrast, or so forth, and optionally additionally or alternatively may include features of key patches which are selected portions of the image. The key patches may be selected by various approaches, such as randomly, using a spatial grid, selection based on regions of high contrast, or so forth, and the key patches may be of uniform size or may be of different sizes. As another example, video files or content are in some embodiments represented by components of a principal components analysis (PCA). Audio files or content are suitably represented by features such as audio spectrum features, audio volume features, or so forth. The output of the object characterization engine 24 is a set of objects 26 corresponding to the set of objects 22 represented by features.

The following notation is used herein. Each object of the set of objects 26 as represented by its features is denoted as $d_i$, where the index i indexes the objects. There are N objects in the set of objects 22 (or, equivalently, in the set of objects 26 represented by features). An objects pairwise distance measurer 30 determines similarity or distance measures for pairs of objects. Given a pair of objects $\{d_i, d_j\}$ the output of the objects pairwise distance measurer 30 is a similarity measure $s(d_i,d_j)$. An adjacency matrix W denotes the N×N matrix having matrix elements $w_{i,j}=s(d_i,d_j)$. It should be noted that in some embodiments not all elements of the similarity or adjacency matrix W are computed. A degree matrix D is defined as the diagonal matrix with elements $d_i=\Sigma_{j=1}^{N} w_{i,j}$ and a Laplacian matrix L of the adjacency matrix W is defined as L=D−W. A normalized adjacency matrix P is the matrix having matrix elements $$p_{i,j} = \frac{w_{i,j}}{d_{i,j}}.$$

The normalized adjacency matrix P defines the transition matrix of a random walk on a graph whose nodes are the objects. In this interpretation, the matrix element $p_{i,j}$ denotes the probability to jump from node i to node j. An average commute time between nodes i and j is the average number of random walk steps to go from the node i to the node j and then back to the node i.

In some embodiments, a symmetry condition $s(d_i,d_j)=s(d_j,d_i)$ holds, and the matrix W is a symmetric matrix. In some embodiments the symmetry condition $s(d_i,d_j)=s(d_j,d_i)$ does not hold, and the matrix W is not symmetric. It is also to be appreciated that in some embodiments not all matrix elements $w_{i,j}=s(d_i,d_j)$ are computed. Still further, the similarity measures $s(d_i,d_j)$ may in some embodiments be approximate values.

The objects clustering system 20 is configured to automatically group the set of objects 22 into a preselected number of clusters, denoted herein as R. The disclosed clustering approach has at least the following advantages: (i) the clustering approach is generic and hence applicable to substantially any object type; the clustering approach does not rely upon substantial clustering task-specific tuning; the clustering approach is scalable to large sets of objects; and the clustering approach is applicable to multiple sets of objects. Such advantages and other advantages will become apparent to the skilled artisan upon reading and understanding the disclosed clustering approaches.

The objects clustering system 20 operates on the similarity measures to cluster the objects by (i) building a sparse nonnegative feature matrix encoding an exact or approximate similarity between pairs of documents; and (ii) performing nonnegative factorization of the feature matrix to obtain soft (or optionally hard) cluster assignments. These operations are described with illustrative reference to the objects clustering system 20 of the FIGURE.

A nonnegative sparse similarity matrix building engine 34 builds a nonnegative sparse similarity matrix 36 based on similarity measures $s(d_i,d_j)$ generated by the objects pairwise distance measurer 30. Conceptually, this can be viewed as a two step process of (i) generating the adjacency matrix W and (ii) sparsifying the adjacency matrix W to generate the nonnegative sparse similarity matrix 36. The sparsifying (ii) is suitably performed, for example, by the F graph technique, which entails constructing an ∈ graph including nodes for object pairs conditional upon a similarity measure of the object pair exceeding a threshold ∈. That is, all adjacency matrix elements $w_{i,j}=s(d_i,d_j)$ are computed, and in the sparsification (ii) only those adjacency matrix elements $w_{i,j}>∈$ are retained. The sparsified adjacency matrix defines the nonnegative sparse similarity matrix If the number of objects N in the set of objects 22 is large, then computing all terms of the adjacency matrix W can be computationally intensive. Accordingly, in some embodiments the nonnegative sparse similarity matrix building engine 34 builds the nonnegative sparse similarity matrix 36 without computing the entire adjacency matrix W. One suitable approach is the K-nearest neighbors (K-NN) graph approach. In this approach, nodes i and j are connected if the object $d_j$ is in the K-NN list for $d_i$. That is, a K-nearest neighbors (K-NN) directed graph is constructed to include a node for first and second objects of the set of objects conditional upon the second object being one of K nearest neighbors of the first object. In some embodiments, the resulting directed K-NN graph defines the nonnegative sparse similarity matrix 36.

The K-NN relationship is not symmetric. For example, it is possible for the situation to arise in which object $d_j$ is one of the K nearest neighbors of object $d_i$ such that the pair $(d_i, d_j)$ is included in the K-NN directed graph, but object $d_i$ is not one of the K nearest neighbors of object $d_j$ such that the pair $(d_j, d_i)$ is not included in the K-NN directed graph. The nonnegative sparse similarity matrix thus generated by the K-NN approach is therefore in general asymmetric, and the resulting graph is said to be a directed graph.

Although the disclosed object clustering techniques are operative with a directed graph, that is, with an asymmetric nonnegative sparse similarity matrix, in some embodiments it is preferred to have a symmetric nonnegative sparse similarity matrix. The K-NN graph may be made undirected, that is, symmetric, by including in the nonnegative sparse similarity matrix a link between nodes i and j if $d_i$ is in the K-NN list of $d_j$ or $d_j$ is in the K-NN list of $d_i$. This amounts to adding matrix elements to the undirected K-NN graph in order to make it symmetric. An alternative approach for making the K-NN graph undirected or symmetric is to remove matrix elements as compared with the undirected K-NN graph by retaining elements only if both $d_i$ is in the K-NN list of $d_j$ and $d_j$ is in the K-NN list of $d_i$.

Advantageously, efficient techniques are available to compute either g graphs or K-NN graphs without computing the distance between each and every pair of documents. If the similarity measure is a metric, it is possible to organize the objects into a tree structure and to use triangular inequality to expedite the search. Other techniques may also be used, such as an approximate iterative approach as described in Povey et al., "Frame discrimination training of HMMs for large vocabulary speech recognition," Technical report No. CUED/F-INFENG/TR332, Cambridge University Engineering Department (2000).

The nonnegative sparse similarity matrix building engine 34 can use other approaches for building the nonnegative sparse similarity matrix 36. For example, to handle non-spherical clusters one can adjust the K-NN graph using a commute-time distance. That is, for each object the K nearest neighbors are computed in terms of commute time distance. Some suitable algorithms that compute approximate nearest neighbors using the commute time distance are set forth in Sarkar et al., "A Tractable Approach to Finding Closest Truncated-commute-time Neighbors in Large Graphs," 23rd Conference on Uncertainty in Artificial Intelligence (UAI), 2007.

Another suitable nonnegative sparse similarity matrix building technique is random sparsification of the iterated K-NN. In this approach, for each object $d_i$, K objects are randomly selected by repeating K times the following procedure: performing a random walk of length m starting at node i choosing the object at the end of the random walk. This amounts to randomly picking neighbors using the proportions given by the rows of a matrix $P^m$ where P is the normalized adjacency matrix having matrix elements $$p_{i,j} = \frac{w_{i,j}}{d_{i,j}}.$$

Another suitable approach is random sparsification of the Laplacian matrix L of the adjacency matrix W, defined as L=D−W where D is the degree matrix defined as the diagonal matrix of adjacency matrix W with elements $d_{i,j} = \sum_{j=1}^{N} w_{i,j}$. The matrix exponential of the Laplacian matrix L is defined by the series $$\exp(\lambda L) = I + \sum_{k=1}^{\infty} \frac{\lambda^k}{k!} L^k$$

where λ is a fixed parameter. This matrix is not sparse, but its rows sum to 1 and therefore correspond to proportions. For each object, K objects are suitably selected using these proportions, leading to a sparse approximation of exp(λL). It is possible to define random walks on the similarity graph that do not entail full computation of exp(λL), for example using the following sampling scheme: for each object $d_i$, perform K independent random walks starting at node i where the walk lengths are drawn from the Poisson distribution $$\left(\frac{\lambda^k}{k!} e^{-\lambda}\right)_{k=0}^{\infty}.$$

Various illustrative approaches have been disclosed by which the nonnegative sparse similarity matrix building engine 34 suitably builds the nonnegative sparse similarity matrix 36. Other building approaches are also contemplated.

A nonnegative factorization engine 40 factorizes the nonnegative sparse similarity matrix 36 to generate factor matrices based upon which a clusters identifier 42 allocates objects of the set of objects 22, for example in the form of cluster allocation probabilities 44 in the case of soft clustering, or cluster assignments in the case of hard clustering. The nonnegative sparse similarity matrix 36 is decomposed into two factor matrices denoted herein as A and B using a nonnegative matrix factorization technique to obtain a soft clustering of the documents. Denoting the nonnegative sparse similarity matrix as X having dimensions n×d, the nonnegative matrix factorization approximates the original matrix X by the matrix product of two low rank matrices A of dimension n×R (matrix A has R columns) and B of dimension R×d (matrix B has R rows). For a preselected number of clusters R, the decomposition is X≈A×B where A≥0 and B≥0. The positivity constraints A≥0 and B≥0 mean that $a_{i,j} \geq 0$ for every (i,j) and $b_{i,j} \geq 0$ for every (i,j). To ensure the uniqueness of the factorization, it is also contemplated to impose the further constraint that the columns of B sum to one.

Nonnegative matrix factorization techniques are known to be efficient clustering techniques for sparse matrices in the context of textual documents characterized by document/word co-occurrence matrices. In that application, elements of the sparse matrix represent occurrences of words in documents. In the object clustering techniques disclosed herein, elements of the nonnegative sparse similarity matrix 36 represent similar objects, for example occurrence of an object in the K-NN list of another object in the case of a K-NN directed graph, that is, a link in the K-NN directed graph. It is recognized herein that applying nonnegative matrix factorization to the nonnegative sparse similarity matrix 36 enables efficient clustering of the objects into clusters.

The number of clusters R is an input 50 to the nonnegative factorization process. The factor matrix A of dimensions n×R and the factor matrix B of dimensions R×d are initialized by a parameters initialize 52, and the nonnegative factorization engine 40 optimizes the factor matrices A and B such that the product A×B of factor matrices A and B approximates the nonnegative sparse similarity matrix 36. The resulting factor matrices A and B encode information as to the membership of each object in each of the R clusters. For example, an element $a_{i,j}$ of the factor matrix A is indicative of the strength of membership (that is, soft clustering) of the object $d_i$ in the cluster indexed by j.

The resulting cluster allocation probabilities 44 can be used in various ways. For example, an object classification annotator 56 can annotate the objects of the set of objects 22 with annotations indicating the allocated cluster or clusters for each object. This entails storing one or more cluster identifications with each object. For a hard clustering approach, the object classification annotator 56 suitably annotates each object with an identification of that cluster for which the object has the highest probability of membership. For soft clustering, the object classification annotator 56 may optionally annotate an object with an identification of more than one cluster for which the object has high probability of membership.

Additionally or alternatively, the resulting cluster allocation probabilities 44 can be displayed on the display 12 of the user interface 10. This can be done in various ways, such as a tabular representation listing objects and corresponding cluster allocation information, or a graphical representation plotting objects as a function of feature values, said feature values being values of features of the objects generated by the object characterization engine 24 and used by the building engine 34 to construct the nonnegative sparse similarity matrix 36.

The nonnegative factorization engine 40 can employ substantially any nonnegative factorization process. In one suitable embodiment, the nonnegative factorization optimizes the factor matrices A and B to minimize a Frobenius norm between the nonnegative sparse similarity matrix 36 and its approximation A×B. In another suitable embodiment, the nonnegative factorization optimizes the factor matrices A and B to minimize a Kullback-Leibler divergence between the nonnegative sparse similarity matrix and its approximation A×B. This embodiment is computationally similar to the optimization performed in probabilistic latent semantic analysis (PLSA). See Hofmann, "Unsupervised learning by probabilistic latent semantic analysis," Journal of Machine Learning, vol. 42, pp. 177-196 (2001). In some such embodiments, the optimization employs a Latent Dirichlet analysis. See Blei et al., "Latent dirichlet allocation", Journal of Machine Learning Research. Vol. 3, pages 993-1022 (2003). The Latent Dirichlet Analysis and PLSA approaches are probabilistic models, which can be advantageous since they can compute quantities such as the log-probability of an object, the probability of assignments, confidence intervals of the parameters, and so forth. Other nonnegative factorization techniques and variant techniques are also contemplated. For example, in a contemplated hierarchical approach, the factorization may be viewed as a tri-factorization of the nonnegative sparse similarity matrix 36. In this conceptualization, the factor matrices A and B are defined as before, and a square matrix H encodes the hierarchy as a lower triangular sparse matrix with normalized rows.

In some applications, some of the objects of the set of objects 22 are "pre-annotated" with a cluster identification. That is, the object is already classified into a cluster. It is straightforward to include this information in the nonnegative factorization process. An element $a_{i,j}$ of the factor matrix A is indicative of the strength of membership (that is, soft clustering) of the object $d_i$ in the cluster indexed by j. Thus, if it is known a priori that document $d_i$ belongs exclusively to cluster c, then during the nonnegative factorization process the terms $a_{i,j}$ are set to zero for all j≠c and the term $a_{i,c}$ is set equal to one.

Nonnegative factorization typically employs an iterative process that can converge to a local minimum. Accordingly, nonnegative factorization is sensitive to the initial values of the parameters set by the parameters initializer 52. In the following illustrative initialization example, the nonnegative factorization is assumed to employ a probabilistic model in which the probability that a document $d_i$ belongs to a cluster $z_k$ is given by:

$$p(z_k \mid d_i) = \frac{a_{i,k}}{\sum_k a_{i,k}}$$

and $p(w_j|z_k)=b_{k,j}$. In this example, the initialization of the $p(w_j|z_k)$ and $p(z_k|d_i)$ parameters is a two-step procedure. First, a set of C initial documents (referred to herein as centroids) are identified, whose indices are denoted herein as $i_k \in \{i_1, \ldots, i_C\}$. Second, the probabilities $p(w_j|z_k)$ and $p(z_k|d_i)$ are initialized as a function of the distance between nodes i and $i_k$.

In some embodiments, the initial cluster centroids are provided by a human operator via the input device or devices 14 of the user interface 10. In other embodiments, the parameters initializer 52 employs an automated process to generate the initial cluster centroids. In some automated embodiments, the cluster centroids are selected to be local density maxima. A suitable measure of density in a graph is the in-degree of a node, that is, the sum of the weights of the edges incoming that node. In the illustrative example, the following greedy procedure is used to choose the centroids. The initial list of centroids Λ is empty. An array dist of size N is initialized, which contains for each node the distance to its closest centroid in the list of centroids Λ. As the list of centroids Λ is initially empty, all the values of dist are initialized to a large value: dist(i)=N, ∀i∈[1, N]. An iterative process follows. For iteration k, denote by $I_i$ the list of nodes in the same connected component as $d_i$. Then $i_k$=arg max$_{i \notin \Lambda}$ $\Sigma_{j \in I_i}$ dist(j) and $i_k$ is added to the list of centroids Λ. The distance is then computed (for example, using Dijkstra's algorithm) of each node in the graph to node $i_k$ and the array dist is updated accordingly. The iterative processing is terminated either when a predefined number of centroids has been obtained, or when the distance from each point to its closest centroids falls below a predefined threshold.

At the first iteration, as all the values of dist are equal, the node with the maximum in-degree is chosen. At the following iterations, a node is likely to be chosen if (i) it has a high in-degree as there will be more terms in $\Sigma_{j \in I_i}$ dist(j) and (ii) if it is far from other centroids as values dist(j) in the sum will be higher. A contemplated variation around the selection criterion is as follows: $i_k$=arg max$_i$ dist(i)×id(i) where id(i) denotes the in-degree of node i.

Once the centroids are chosen, the parameters $p(w_j|z_k)$ and $p(z_k|d_i)$ are initialized. In this example, the distances l(i→$i_k$) are computed to go from each node i to each centroid node $i_k$ in the graph. Also computed is the distance i($i_k$→i) to go from each centroid node $i_k$ to each node i. In both cases, Dijkstra's algorithm is suitably used for the distance calculations. Once the 2×N×C distances have been computed, the parameters $p(w_j|z_k)$ and $p(z_k|d_i)$ are initialized as a non-increasing function of the distances. These initialization suitably use the following formulas: $p(w_j|z_k) \propto \alpha^{l(i_k \to i)}$ and $p(z_k|d_i) \propto \alpha^{l(i_k \to i)}$ with 0<α<1. The value α=0.5 is suitable for some embodiments.

In the illustrative initialization procedure described as an example, the distance to go from one node to another is measured using the shortest path (Dijkstra's algorithm). Another contemplated approach is to compute the mean first passage time. Although this approach is significantly more costly than the shortest path one, it may provide a more robust initialization as it does not take into account a single path but all possible paths.

The disclosed object clustering techniques have been tested using a set of labeled images, so as to evaluate how well the clustering algorithm results match the category labels. The number of images to cluster is denoted as N, the number of images in cluster c is denoted as n(c), and the number of images in cluster c with category label i is denoted as n(i,c). The purity of cluster c may be defined as:

$$max_i \frac{n(i, c)}{n(c)}.$$

The average cluster purity P is defined as the average of the cluster purities, weighted by the importance of the clusters, that is:

$$P = \sum_c \left(\frac{n(c)}{N}\right)\left(max_i \frac{n(i, c)}{n(c)}\right) = \frac{1}{N}\sum_c max_i\, n(i, c).$$

The set of images used for testing was a database containing 30,263 manually labeled images. The test database contained 19 classes of objects and scenes: beach, bicycling, birds, boats, cats, clouds/sky, desert, dogs, flowers, golf, motor sports, mountains, people, sunrise/sunset, surfing, underwater, urban, waterfalls and winter sports. Each image was represented by a large feature vector containing on the order of 25,000 dimensions. The distance between two vectors x and y was measured using the following metric:

$$d(x, y) = \left\|\frac{x}{\|x\|_1} - \frac{y}{\|y\|_1}\right\|_1.$$

The nonnegative sparse similarity matrix was constructed as a non-symmetric K-NN graph with K=10. Spectral clustering was used as a comparative object clustering technique. See Ng et al., "On spectral clustering: analysis and an algorithm," NIPS (2002).

Construction of the nonnegative sparse similarity matrix was as follows. A kernel matrix was computed. The metric was transformed into a kernel in the following manner: $k(x,y)=\exp(-\gamma \times d(x,y))$. The value γ was determined experimentally through cross-validation. It was found experimentally that k(x,y) defines a suitable kernel for this set of objects, and all the eigenvalues of the kernel matrix were positive for reasonable values of γ. Due to the size of the set of objects being clustered, the kernel matrix was sparsified for memory and computational reasons by transformation of the dense matrix into a symmetric K-NN graph. The value K=10 was chosen for comparability with spectral clustering. Arpack++ was used to solve the eigenvalue problem in the case of sparse matrices. The dimension of the subspace was set equal to the number of clusters. The iterative procedure for the initialization of K-means disclosed herein was used. The spectral clustering algorithm was executed ten different times with different initializations of the K-means algorithm. To facilitate comparison with spectral clustering, the number of clusters was set manually. The results are shown in Table 1.

TABLE 1

| # of clusters | Average cluster purity P (Spectral clustering) | Average cluster purity P (Disclosed approach) |
|---|---|---|
| 25 | 0.451 (0.010) | 0.466 |
| 50 | 0.538 (0.005) | 0.537 |
| 100 | 0.584 (0.004) | 0.581 |

The results shown in Table 1 indicate substantially similar results obtained using both approaches. For the 100 clusters problem, the Arpack++ eigenvalues computation took approximately two minutes whereas the nonnegative factorization of the present approach took about 50 seconds.

For high dimensional data, experiments indicate that the K-NN graph computation of the nonnegative sparse similarity matrix works well. However, this computational approach is expected to be less effective when the clusters are very long manifolds, for example in a low dimensional space. In this case, a sparsification of the pseudo-inverse of the Laplacian is expected to give better results.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A clustering method comprising:
   constructing a nonnegative sparse similarity matrix for a set of objects wherein the elements of the nonnegative sparse similarity matrix comprise similarity measures $s(d_i, d_j)$ where $\{d_i, d_j\}$ is a pair of objects of the set of objects and wherein the constructing includes performing a sparsification operation;
   performing nonnegative factorization of the nonnegative sparse similarity matrix wherein the performing comprises:
      approximating the nonnegative sparse similarity matrix by a product A×B of factor matrices A and B where the factor matrix A has R columns and the factor matrix B has R rows where R is a preselected number of clusters, and
      initializing parameters of the factor matrices A and B based on the preselected number of clusters R and a set of cluster centroids wherein the initializing comprises initializing parameters of the factor matrices A and B based on distances between nodes of the nonnegative sparse similarity matrix and the cluster centroids; and
   allocating objects of the set of objects to clusters based on factor matrices generated by the nonnegative factorization of the nonnegative sparse similarity matrix;
   wherein the constructing, performing, and allocating are performed by a processor executing software or firmware.

2. The clustering method as set forth in claim 1, wherein the initializing comprises:
   receiving the set of cluster centroids via a graphical user interface.

3. The A clustering method as set forth in claim 1, comprising:
   constructing a nonnegative sparse similarity matrix for a set of objects wherein the elements of the nonnegative sparse similarity matrix comprise similarity measures $s(d_i, d_j)$ where $\{d_i, d_j\}$ is a pair of objects of the set of objects and wherein the constructing includes performing a sparsification operation;

performing nonnegative factorization of the nonnegative sparse similarity matrix wherein the performing comprises:

approximating the nonnegative sparse similarity matrix by a product A×B of factor matrices A and B where the factor matrix A has R columns and the factor matrix B has R rows where R is a preselected number of clusters, and initializing parameters of the factor matrices A and B based on the preselected number of clusters R and a set of cluster centroids wherein the initializing comprises selecting the set of cluster centroids as local density maxima; and allocating objects of the set of objects to clusters based on factor matrices generated by the nonnegative factorization of the nonnegative sparse similarity matrix;

wherein the constructing, performing, and allocating are performed by a processor executing software or firmware.

4. The clustering method as set forth in claim 1, wherein the objects are images, and the constructing comprises:

extracting features from the image objects;

measuring similarity between image objects based on the features; and constructing the nonnegative sparse similarity matrix based on the measured similarities.

5. The clustering method as set forth in claim 1, wherein the constructing including performing a sparsification operation comprises one of:

constructing an $\in$ graph defining the nonnegative sparse similarity matrix, the $\in$ graph including nodes for object pairs conditional upon a similarity measure of the object pair exceeding a threshold $\in$, constructing a K-nearest neighbors (K-NN) directed graph defining the nonnegative sparse similarity matrix, the K-NN directed graph including a node for first and second objects of the set of objects conditional upon the second object being one of K nearest neighbors of the first object, and constructing an adjacency matrix having matrix elements corresponding to object pairs, the matrix element values being nonnegative values indicative of similarity of the corresponding object pairs, and deriving a commute time matrix from the adjacency matrix.

* * * * *